Dec. 5, 1967    E. F. WARD    3,356,360
APPARATUS FOR SUPPORTING STACKED AND BONDED
LAMINATIONS FOR ELECTRICAL APPARATUS
Filed Aug. 25, 1964    2 Sheets-Sheet 1
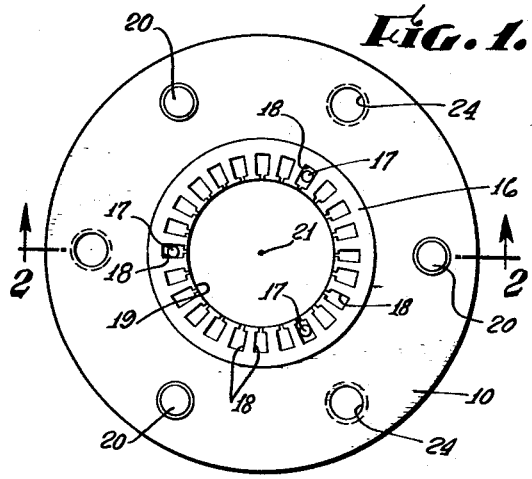
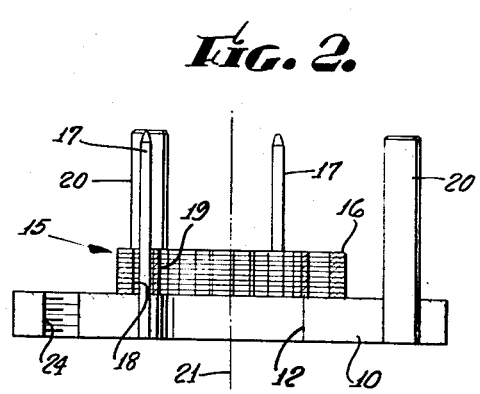
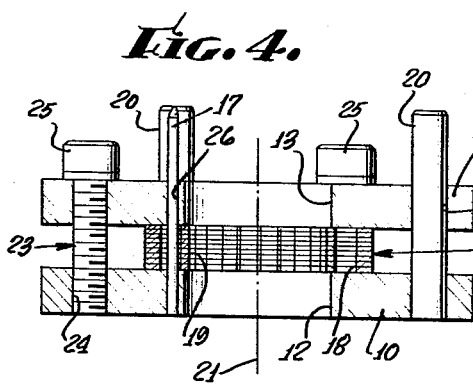
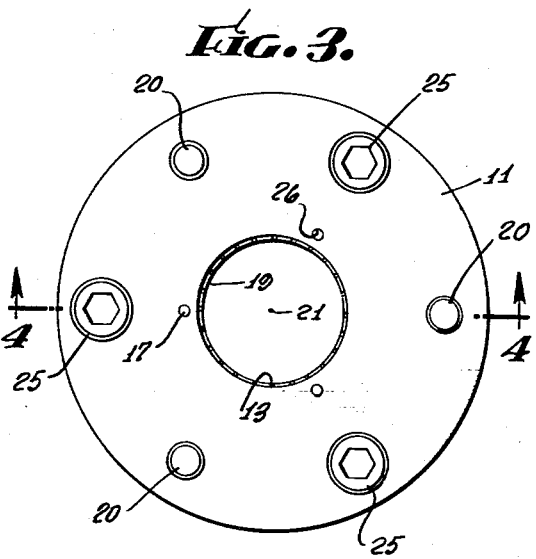
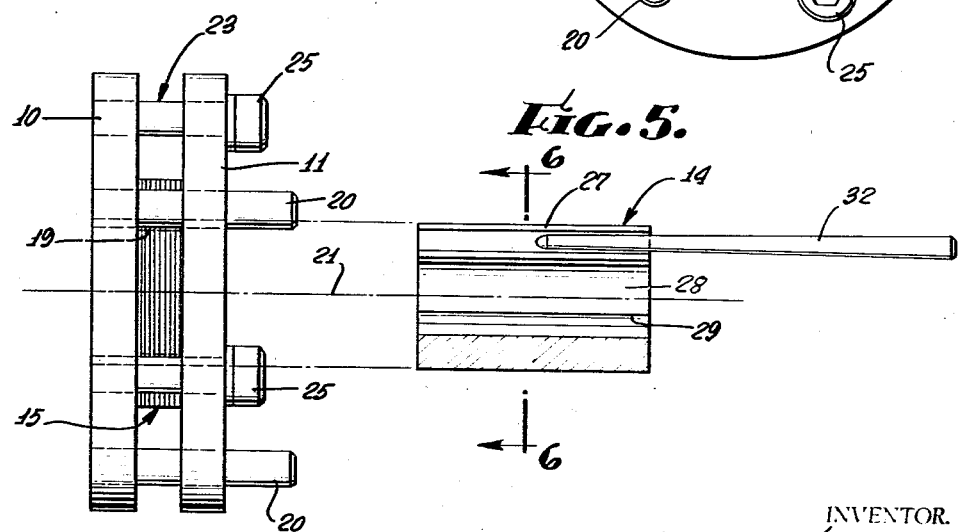
INVENTOR.
ELMER F. WARD
BY White & Haefliger
ATTORNEYS.

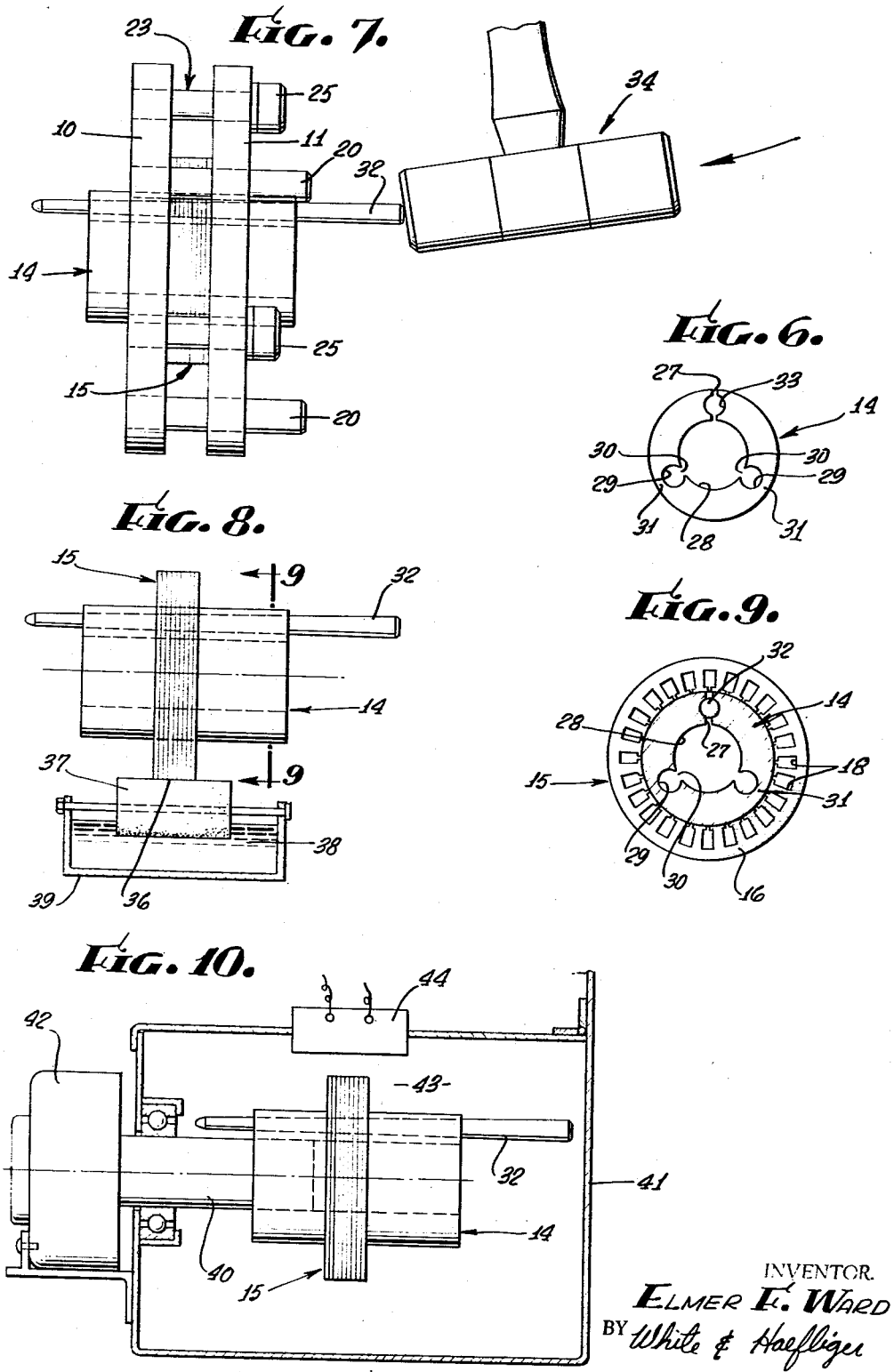

United States Patent Office 3,356,360
Patented Dec. 5, 1967

3,356,360
APPARATUS FOR SUPPORTING STACKED AND BONDED LAMINATIONS FOR ELECTRICAL APPARATUS
Elmer F. Ward, Santa Ana, Calif., assignor to Task Corporation, Anaheim, Calif., a corporation of California
Filed Aug. 25, 1964, Ser. No. 391,846
3 Claims. (Cl. 269—52)

This invention relates generally to the fabrication of bonded stacks of laminations, and more particularly concerns method and apparatus for bonding together thin rotor or stator laminations in a stack for use in electrical machinery.

In the past, laminations have been bonded by applying the liquid form bonding agent to the faces of the laminations, which were then pressed together in a stack and cured. This procedure creates certain problems, including the tendency of excess bonding agent to exude at the edges of the stack requiring a clean-up operation, the great difficulty of cleaning such exuded bonding agent from intricate and inaccessible interior edges of the laminations in a stack, and the excessive cost of this time consuming clean-up operation. It is possible to overcome these difficulties to a considerable degree as by initially compressing the stack of laminations before applying the bonding agent, and then effecting such application to the outer edges of the stack while the laminations remain compressed. Advantage may thus be taken of capillary action, by which the liquid bonding agent creeps between the laminations at their interfaces and toward interior stack edges, so that the penetrated bonding agent does not exude at such inaccessible interior edges. However, this procedure requires the use of considerable tooling in that one complex stack compressing fixture is required for use with each stack, and not only is such equipment expensive but it is difficult to handle during the curing stage to effect desired uniform curing. Also, such tooling tends to become contaminated with bonding agent, which must be cleaned therefrom.

The present invention has as its major object the provision of method and apparatus by which the advantages of capillary action penetration of bonding agent between laminations may be retained and at the same time complex tooling is not required to hold the lamination stack in compressed condition during curing. Additional objects include substantial savings in cost of producing lamination stacks, the production of a higher quality product, and the elimination of need to clean bonding agent off the minimal tooling that may be used in carrying out the unusually effective and novel process.

Basically, the novel method of forming a bonded stack of laminations having supportable edges includes the steps of effecting local application of a fluid bonding agent to the laminations, and maintaining the laminations solely edge supported in stacked condition to induce penetration of the bonding agent between the laminations by capillary action and directionally toward the supported edges. Further, at least partial curing of the bonding agent penetrated between the laminations is carried out while the laminations remain solely edge supported in stacked condition.

While the process and apparatus may be considered as appliacble to bonding laminations other than those used in electrical machining, it will be described in connection with the latter type laminations. Thus, the laminations will typically have openings therein, and the novel method will include the step of assembling the laminations in a stack on a mandrel passing through the lamination openings. After fluid bonding agent is applied to outer edge portions of the laminations, they are maintained in stacked condition in the mandrel to induce penetration of the bonding agent between the laminations by capillary action. Typically, the assembling step includes aligning the lamination openings, compressing the aligned laminations in a stack, and then passing the mandrel relatively through the aligned openings and securing the laminations in supported condition on the mandrel. As will be described, such securing may be effected in simple and rapid manner as by expanding the mandrel against lamination inner edges bounding the openings. Thereafter, the bonding agent may be applied to the stack secured on the mandrel, and the mandrel may be rotated in an oven to effect curing of the bonding agent which penetrates between the laminations by capillary action.

Certain novel apparatus usable in practicing the above method typically comprises means for releasably retaining a stack of laminations having openings therein with the openings maintained in aligned condition and the stack retained in compressed condition within a zone formed by said means, and a hollow mandrel receivable in said zone and through the lamination openings, the mandrel having a split and being expansible to widen the split and to engage and support lamination edges bounding the openings, whereby after release of the mandrel supported laminations by said means the laminations will remain supported in stacked condition on the mandrel. More specifically, the mandrel may be tubular with the split extending lengthwise thereof. Also, the lamination retaining means may advantageously comprise a pair of platens having openings therein to pass the mandrel, together with structure to guide and urge the platens toward one another while the platens remain facing one another to clamp the laminations therebetween while the openings in the platens and laminations remain aligned.

These and other objects and advantages of the invention, as well as the details of illustrative embodiments, will be more fully understood from the following detailed description of the drawings in which:

FIG. 1 is a plan view showing of a portion of one form of means to releasably and initially retain a stack of laminations in compressed and aligned condition;

FIG. 2 is a section taken on line 2—2 of FIG. 1;

FIG. 3 is a view like FIG. 1, but showing the entire means;

FIG. 4 is a section taken on line 4—4 of FIG. 3;

FIG. 5 shows a lamination supported mandrel in position to be relatively advanced into the lamination stack zone formed by the retaining means of FIG. 4;

FIG. 6 is a section taken through the mandrel on line 6—6 of FIG. 5;

FIG. 7 shows the mandrel fully relatively advanced into the stack zone formed by the lamination retaining means, and one method of expanding the mandrel against the lamination edges bounding the lamination openings receiving the mandrel;

FIG. 8 shows the lamination stack solely edge supported on the mandrel, and one method of applying liquid form bonding agent to the lamination free outer edges;

FIG. 9 is a section taken on line 9—9 of FIG. 8; and

FIG. 10 is an elevation taken in section through one form of means to rotate the mandrel in an oven or otherwise heated environment for uniformly curing the bonding agent.

Referring first to FIGS. 1–4, they illustrate one form of means for releasably retaining a stack of laminations having openings therein with the openings maintained in aligned condition and the stack retained in compressed condition. Such an element may comprise the two platens or plates 10 and 11 having openings 12 and 13 therein to pass a mandrel 14 seen in FIG. 5. A stack 15 of laminations 16 is typically assembled on platen 10 and located thereon as by projecting members or pins 17 which pass through the lamination slots 18. As thus oriented, the central openings 19 in the thin metallic annular laminations 16 are coaxially aligned with the openings 12 and 13 in platens 10 and 11. Also, the slots 18 in the laminations are in alignment by virtue of the fact that the diameters of members 17 are substantially equal to the circular dimensions or widths of the slots 18. In this regard, the diameters of openings 19 in the laminations are slightly smaller than the diameters of the openings 12 and 13 in the platens.

The above means element may also include structure to guide and urge the platens toward one another while they remain facing one another to clamp the laminations therebetween. The example of such structure seen in the drawings includes three guide pins or dowels 20 carried on platen 10 to project parallel to its axis 21, and three corresponding pin guiding holes 22 in platen 11. The example in the drawings also includes screw threaded fasteners 23 carried on platen 11 to tighten into threaded bores 24 on platen 10, whereupon the fastener heads 25 act on platen 11 to urge the platens together for clamping the lamination stack 15 in the stack zone formed between the platens. Small holes 26 in platen 11 freely receive members 17 during the assembly of components.

Extending the description to FIGS. 5–7, a hollow mandrel such as that seen at 14 is receivable in the stack zone, and in particular through the lamination central openings 19, the mandrel having a split and being expansible to widen the split and to engage and support the lamination edges bounding the openings in the laminations. For example, the mandrel 14 is tubular and has a split 27 extending lengthwise thereof.

As seen in FIG. 6, one form of tubular mandrel construction unusually well adapted to perform the totality of mandrel functions has a bore 28 and three nearly equally circularly spaced lengthwise extending holes in the tubular wall, two holes 29 intersecting bore 28 at the locations 30. As a result two flexures are found at 31 to accommodate substantially uniform expansion of the mandrel into forcible engagement with the inner edges 19 of the laminations when an expansion pin 32 is driven into the remaining hole 33 at the split 27. FIG. 7 illustrates the manner in which a hammer 34 may be used to drive tapered pin 32 into hole 33 after the mandrel is inserted through the openings 19 of laminations 16 held clamped between the platens.

Following the securing of the laminations 16 in inner edge supported condition on the mandrel, the platens may be removed as by unscrewing the fasteners 23 and separating the platens away from opposite ends of the lamination stack 15. The expensive platens may then be used to assemble another stack of laminations independently of further processing of compressed stack 15 now mounted on relatively inexpensive mandrel 14.

Such further processing includes effecting local application of a fluid bonding agent, such as a liquid epoxide resin, to lamination edges, and maintaining the laminations solely edge supported in stacked condition to induce penetration of the bonding agent between the laminations by capillary action and directionally toward the supported edges. For example, the epoxide may be applied to the outer edges 36 of the laminations mounted on mandrel 14, as in FIGURE 8 showing the mandrel in position to rotate the stack 15 with edges 36 contacting a transfer roller 37 dipping into the liquid bonding agent 38 in receptacle 39. The applied agent then proceeds to penetrate between the laminations by capillary action, and without exuding at the complexly slotted inner edge structure of the laminations.

Such further processing may also include the step of at least partially curing the bonding agent penetrated between the laminations while they remain solely edge supported in stacked condition on the mandrel. For this purpose, the mandrel may be rotated in a heated region during the curing cycle. FIGURE 10 illustrates the mandrel mounted on a shaft 40 slowly rotated in a chamber 41 as by rotary drive 42. The interior region 43 of chamber 41 may be kept heated at elevated temperature as by heater unit 44. Typically, the interior is kept at around 250° F. and the mandrel and lamination stack 15 slowly rotated therein for 5 to 8 hours, although different temperatures and curing times may be employed. In any event, it is seen that the platens need not be used to retain and compress the laminations during curing, whereby they are not contaminated with bonding agent and they may be used to assemble a large number of mandrel supported lamination stacks.

Following such curing, the mandrel is removed from the chamber 41, and pin 32 knocked free of the mandrel which then contracts, allowing the finished and bonded stack to be easily slipped off the mandrel.

I claim:
1. In apparatus for supporting a stack of generally annular thin laminations usable in a rotary electric machine, said laminations each having slots therethrough which are aligned when the laminations are assembled in face to face relationship in a stack, and including a mandrel means for internally supporting said stack of laminations so that the exterior periphery of the stack is exposable to receive an application of liquid bonding agent, the improvement in the mandrel means comprising:
   a mandrel which is expandible sufficiently to internally support all laminations of said stack when the mandrel is projected centrally within the stack and expanded, said mandrel being expandible by a pin means insertable into a split portion of the mandrel means which extends longitudinally of the mandrel, said pin means being of such a diameter that the mandrel is uniformly expanded when said pin means is forcibly driven into said split portion.

2. The improvement of claim 1 wherein said split portion of said mandrel means includes a longitudinally extending bore for receiving the pin means, said bore being laterally offset from the central axis of the mandrel means.

3. The improvement of claim 1 wherein said pin means is tapered for being easily received into said split portion of the mandrel means.

References Cited
UNITED STATES PATENTS

| | | | |
|---|---|---|---|
| 2,423,869 | 7/1947 | Blessing | 156—60 |
| 2,581,845 | 1/1952 | Elliott | 156—60 |
| 2,644,497 | 7/1953 | Wilmer et al. | 269—52 |
| 3,043,147 | 7/1962 | Will | 156—64 |
| 3,222,234 | 12/1965 | De Jean et al. | 156—60 |

JACOB H. STEINBERG, *Primary Examiner.*